F. C. TENNYSON.
Flower-Basket.

No. 207,083. Patented Aug. 13, 1878.

WITNESSES
INVENTOR.
ATTORNEYS.

UNITED STATES PATENT OFFICE.

FANNIE C. TENNYSON, OF TYLER, TEXAS.

IMPROVEMENT IN FLOWER-BASKETS.

Specification forming part of Letters Patent No. 207,083, dated August 13, 1878; application filed June 22, 1878.

*To all whom it may concern:*

Be it known that I, FANNIE C. TENNYSON, of Tyler, in the county of Smith and State of Texas, have invented a new and valuable Improvement in Flower-Baskets; and I do hereby declare that the following is a full, clear, and exact description of the construction and operation of the same, reference being had to the annexed drawings, making a part of this specification, and to the letters and figures of reference marked thereon.

Figure 1:
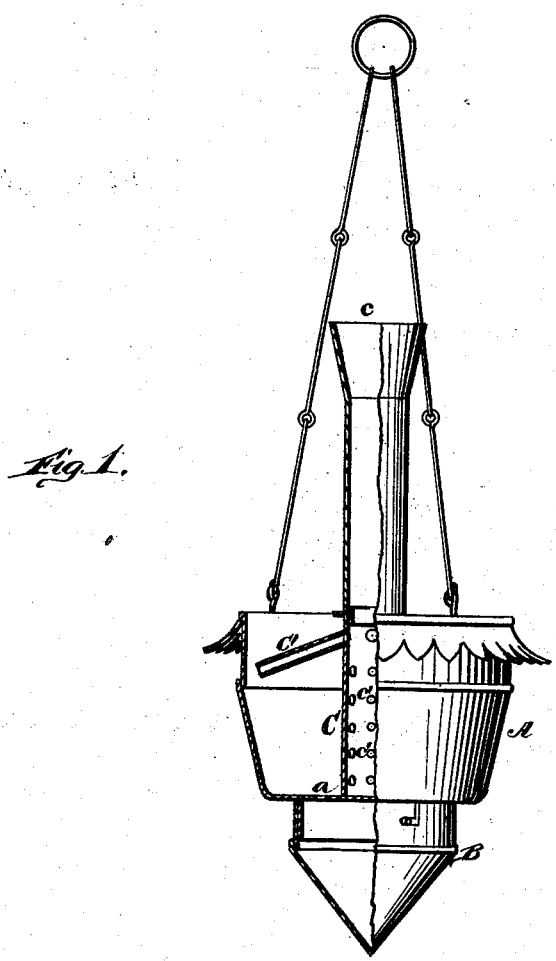
Figure 2:
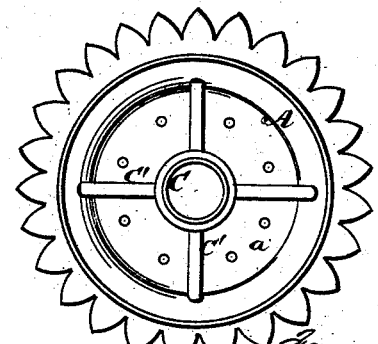

Figure 1 of the drawings is a representation of a half-sectional side view of my flower-basket, and Fig. 2 is a plan view of the plant-pot.

The nature of my invention relates to flower-baskets adapted to be hung in residences, and supplied with necessary water without soiling the apartments of the residence with leakage.

The invention consists in a metal plant-pot with a perforated bottom, leading into a removable or hinged reservoir. From the perforated bottom, extending upward, is a hollow tube with a flaring top, into which the water is poured. Leading from this tube, within the body of the plant-pot, are branch pipes, having open bottoms to convey the water outward into the soil among the smaller roots of the plants. The portion of the water-tube below the surface of the soil is perforated to allow the water to ooze out into the soil at all points.

Any suitable ornamentation may be made, and the device is provided with ornamental chains, by which it is suspended.

Referring to the drawings, A represents the plant-pot, provided with a perforated bottom, $a$, which leads into a removable or hinged imperforate reservoir, B. C represents a hollow tube with flaring open top $c$, secured to the perforated bottom $a$ of the plant-pot A, and the portion of said tube which is within the body of the plant-pot, adapted to be beneath the surface of the soil therein, is perforated on all sides at $c'$. Leading radially outward from the water-tube C are smaller open-bottomed tubes C', which convey the water outward into the soil. Suitable ornamental chains are attached, by which the flower-pot may be suspended.

The reservoir B forms a tight joint with bottom of the plant-pot. The water is fed into the flaring top or hopper of the tube, is carried outward into the soil by the small radial branch pipes, and oozes gradually out of the perforations in the tube beneath the surface of the soil. The reservoir catches the water which leaks through the perforated bottom and allows none to escape.

It will thus be seen that I provide a very beautiful ornament to parlors or other apartments of residences, supply necessary water for the plants in an improved and efficient manner, and prevent the soiling of the apartments from leakage.

By using the flaring top of the water-tube as a bouquet-holder a beautiful effect is produced, and the stems of the flowers in the bouquet being in the water in the tube will be preserved as in a vase.

What I claim as new, and desire to secure by Letters Patent, is—

The feed-tube C, having branches C' and perforations $c'$, and provided with flaring top $c$ to receive bouquets, and the like, combined with a flower-basket, as specified.

In testimony that I claim the above I have hereunto subscribed my name in the presence of two witnesses.

FANNIE C. TENNYSON.

Witnesses:
JNO. H. BONNER,
M. E. McDOUGAL.